United States Patent
Elrom et al.

(10) Patent No.: US 8,380,938 B2
(45) Date of Patent: Feb. 19, 2013

(54) PROVIDING SHARED ACCESS TO DATA STORAGE RESOURCES ACROSS CLUSTER COMPUTING ENVIRONMENT BOUNDARIES

(75) Inventors: Ofer Elrom, Kibutz Gazit (IL); Eran Raichstein, Yokneam Ilit (IL); Gregory John Tevis, Tucson, AZ (US); Oren Wolf, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 12/712,046

(22) Filed: Feb. 24, 2010

(65) Prior Publication Data

US 2011/0208930 A1    Aug. 25, 2011

(51) Int. Cl.
*G06F 12/10* (2006.01)

(52) U.S. Cl. ......................................... 711/147
(58) Field of Classification Search .................. None
See application file for complete search history.

(56) References Cited

U.S. PATENT DOCUMENTS

| | | | |
|---|---|---|---|
| 7,085,867 B2 * | 8/2006 | Qi ................................. | 710/200 |
| 7,272,852 B2 * | 9/2007 | Honda et al. .................... | 726/10 |
| 7,328,226 B1 | 2/2008 | Karr et al. | |
| 7,403,987 B1 | 7/2008 | Marinelli et al. | |
| 2004/0215749 A1 | 10/2004 | Tsao | |
| 2005/0044281 A1 * | 2/2005 | McCarthy ......................... | 710/5 |
| 2007/0112931 A1 | 5/2007 | Kuik et al. | |
| 2007/0214196 A1 | 9/2007 | Garimella et al. | |
| 2007/0294562 A1 | 12/2007 | Takamatsu et al. | |
| 2008/0147893 A1 | 6/2008 | Msrripudi et al. | |
| 2008/0208933 A1 | 8/2008 | Lyon | |
| 2009/0049259 A1 | 2/2009 | Sudhakar | |

FOREIGN PATENT DOCUMENTS

| | | |
|---|---|---|
| EP | 0917065 A2 | 5/1999 |
| EP | 1246060 A1 | 10/2001 |
| WO | 99/63441 A1 | 12/1999 |

* cited by examiner

*Primary Examiner* — Duc Doan
(74) *Attorney, Agent, or Firm* — Patterson & Sheridan, LLP

(57) ABSTRACT

Providing shared access to data storage resources in a cluster computing environment, including detecting when a computer node requests access to a data storage device in a manner that excludes a computing device from accessing the data storage device, where the computer node is configured to communicate with the data storage device along a first communications channel, and where the computing device is configured to communicate with the data storage device along a second communications channel that is exclusive of the first communications channel, and responsive to the detecting, causing the data storage device to allow the computer node and the computing device to share access to the data storage device.

19 Claims, 3 Drawing Sheets

PROVIDING SHARED ACCESS TO DATA STORAGE RESOURCES ACROSS CLUSTER COMPUTING ENVIRONMENT BOUNDARIES

FIELD OF THE INVENTION

The present invention relates to computer networks in general, and more particularly to providing shared access to data storage resources.

BACKGROUND OF THE INVENTION

In a cluster computing environment multiple computer nodes typically share data storage devices. In order to prevent conflicts that may arise when multiple nodes in a cluster attempt to access the same data storage device at the same time, techniques have been developed to provide access to data storage devices in a controlled manner, such as where a node is given exclusive ownership over part or all of a data storage device for a period of time. For example, in a SCSI-based Storage Area Network (SAN), a node may issue a "SCSI reserve" command to obtain exclusive ownership of a SCSI device. Once a SCSI device is reserved in this manner, it refuses all commands from all other nodes until exclusive ownership of the SCSI device is revoked, such as after an "SCSI reset" command is received by the SCSI device.

Back-up copies of data stored on data storage devices, such as for disaster-recovery purposes, are often made without taking the data storage devices off-line, thus ensuring that primary data providers/consumers, such as computer users and other processes and applications, have continuous access to data. Such back-ups are often made by dedicated back-up servers that access data storage devices by making data requests of the nodes in a cluster that are connected to the data storage devices. Unfortunately, this results in additional processing overhead for such participating nodes. Alternatively, dedicated back-up servers access data storage devices via data communications channels that are separate from those that are normally used to provide data to primary data providers/consumers. This is done to minimize the impact that the data back-up service has on the performance and responsiveness of the overall system. Unfortunately, in a cluster computing environment where the nodes themselves control access to data storage devices, a dedicated back-up server may be denied access to a data storage device, thus hindering the data back-up service.

SUMMARY OF THE INVENTION

In one aspect of the invention a method and computer program product provide shared access to data storage resources in a cluster computing environment, including detecting when a computer node requests access to a data storage device in a manner that excludes a computing device from accessing the data storage device, where the computer node is configured to communicate with the data storage device along a first communications channel, and where the computing device is configured to communicate with the data storage device along a second communications channel that is exclusive of the first communications channel, and responsive to the detecting, causing the data storage device to allow the computer node and the computing device to share access to the data storage device.

In another aspect of the invention a system provide shared access to data storage resources in a cluster computing environment, the system including a data storage device, a plurality of computer nodes operating in a cluster computing environment and being configured to communicate with the data storage device along a first communications channel, and a computing device configured to communicate with the data storage device along a second communications channel that is exclusive of the first communications channel, where at least one of the computer nodes is configured with a filter device driver that is configured to receive from the computing device a request to access the data storage device, detect when the computer node that is configured with the filter device driver requests access to the data storage device in a manner that excludes the computing device from accessing the data storage device, and cause the data storage device to allow the computing device to share access to the data storage device with the computer node that is configured with the filter device driver.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
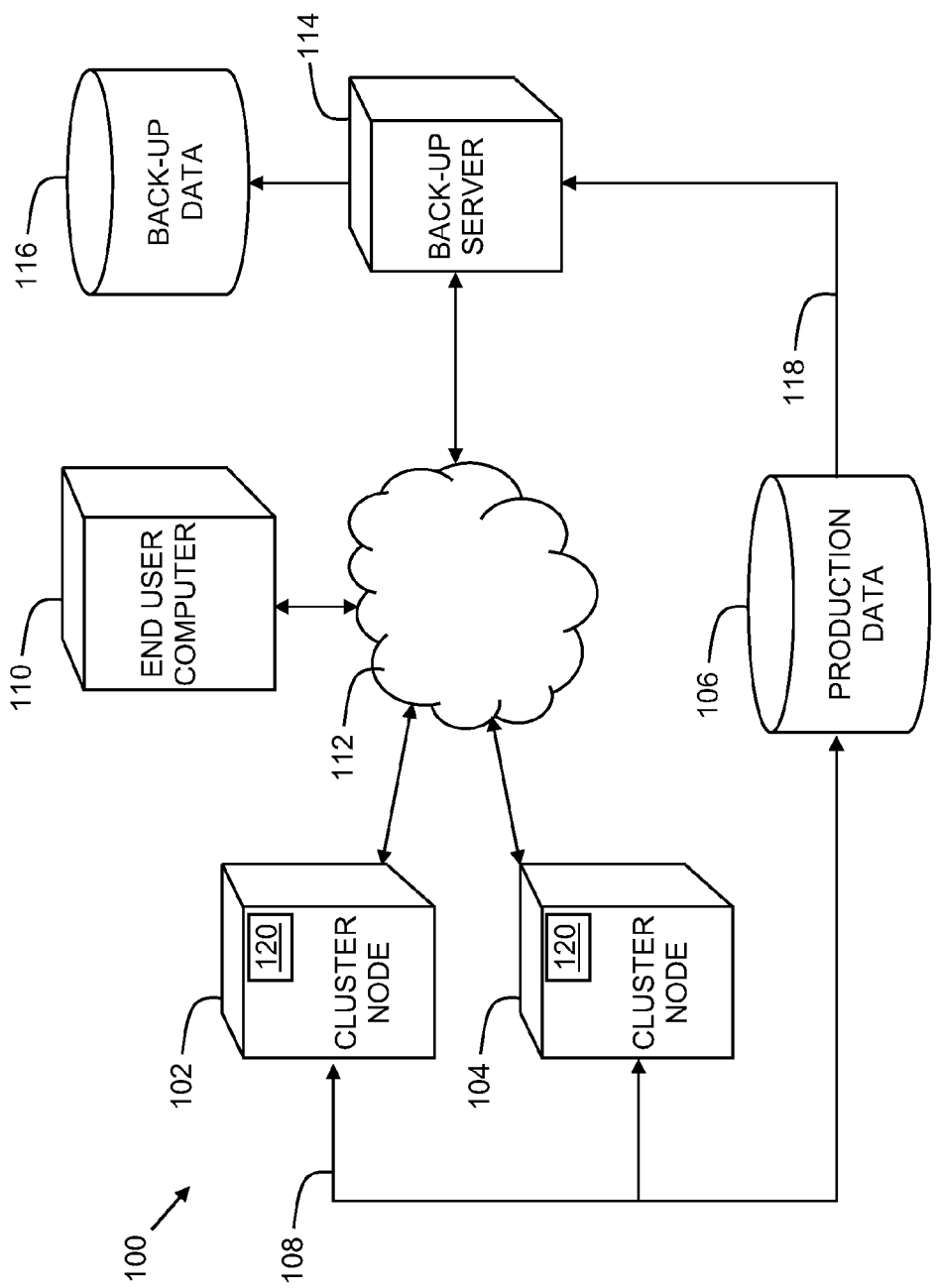
FIG. 1 is a simplified conceptual illustration of a system for providing shared access to data storage resources in a cluster computing environment, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for providing shared access to data storage resources in a cluster computing environment, constructed and operative in accordance with an embodiment of the invention. In the system of FIG. 1, a cluster, generally designated 100, of computer nodes is shown, including at least a node 102 and a node 104. The nodes in cluster 100 share a data storage device 106, such as in a SCSI-based Storage Area Network (SAN) environment where the nodes in cluster 100 access data storage device 106, on which production data is stored, via SAN data communications channels 108 in accordance with conventional techniques. An end-user computer 110 is shown, such as may communicate with any of the nodes in cluster 100 via a network 112.

The system of FIG. 1 also includes a computing device, such as a back-up server 114 having a back-up repository 116 onto which back-up server 114 stores back-up copies of data. Back-up server 114 is preferably a dedicated back-up server that is capable of accessing data storage device 106 via a SAN data communications channel 118 that is separate from SAN data communications channels 108.

In the system of FIG. 1, each of the nodes in cluster 100 are configured with a filter device driver 120 that monitors communications sent to and from the node that relate to controlling access to data storage device 106.

Figure 2:
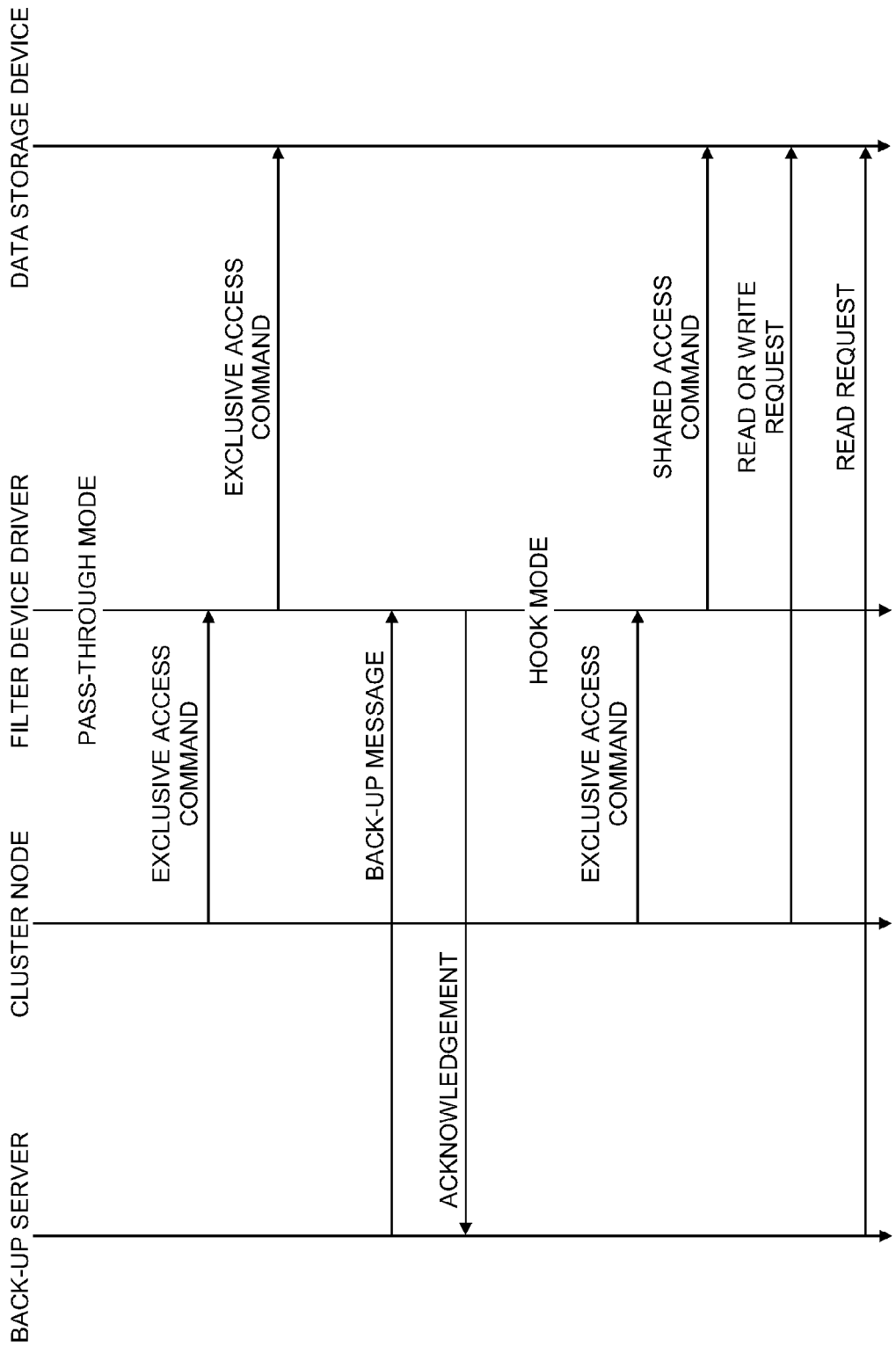
FIG. 2 is a simplified sequence diagram of an exemplary method of operation of the system of FIG. 1, operative in accordance with an embodiment of the invention.

Reference is now made to FIG. 2, which is a simplified sequence diagram of an exemplary method for providing shared access to data storage resources in a cluster computing environment, operative in accordance with an embodiment of the invention. The method of FIG. 2 may be used to operate the system of FIG. 1, where the back-up server, cluster node, filter device driver, and data storage device referred to in FIG. 2 represent back-up server 114, cluster node 102 or 104, filter device driver 120, and data storage device 106 of FIG. 1 respectively. In the method of FIG. 2, a filter device driver initially operates in a pass-through mode, where communications that are to be sent by a given node in a cluster and that relate to controlling access to a data storage device are allowed by the filter device driver at that node to be sent by the node without modification. Thus, for example, where a node wishes to send an exclusive access command, such as a "SCSI reserve" command, to a data storage device in order to obtain exclusive access to the data storage device, if the filter device driver at that node is operating in pass-through mode, the filter device driver at that node allows the "SCSI reserve" command to be sent to the data storage device. When a back-up server wishes to back-up data stored on the data storage device, the back-up server sends messages to each of the filter device drivers at each of the nodes in the cluster, where the messages identify the back-up server, such as by using a World Wide Name (WWN), and indicate that the back-up server wishes to perform a backup of data on the data storage device. After receiving the message from the back-up server, each filter device driver enters a "hook" mode of operation and preferably sends an acknowledgement to the back-up server acknowledging receipt of the message. While in hook mode each filter device driver ensures that its node takes no action that would prevent the back-up server from backing-up data stored on the data storage device. For example, if the filter device driver at a node is in hook mode, and the node attempts to send an exclusive access command, such as a "SCSI reserve" command, to the data storage device in order to obtain exclusive access to the data storage device, before the command is sent the filter device driver at that node changes the command to a shared access command, such as a "SCSI persistent reserve" command. The "SCSI persistent reserve" command is then sent to the data storage device together with an identification of at least the node, as the requesting node, and the back-up server. The "SCSI persistent reserve" command thus provides both the requesting node and the back-up server with shared access to the data storage device, although the back-up server is preferably limited to read-only access of the data storage device. The node may then access the data storage device as needed, while at the same time the back-up server may back-up the data storage device, preferably only after receiving messages from each of the filter device drivers in the cluster acknowledging receipt of the back-up server's message. While in hook mode the filter device driver preferably allows other node commands to be sent without modification where the command would not prevent back-up server from backing-up data.

If the filter device driver at a node enters hook mode after the node has issued an exclusive access command, such as a "SCSI reserve" command, to the data storage device in order to obtain exclusive access to the data storage device, the filter device driver at that node preferably cancels the exclusive access command and sends a shared access command, such as a "SCSI persistent reserve" command, to the data storage device as described above, providing the back-up server with shared access to the data storage device. Similarly, if the filter device driver at a node enters hook mode after the node has issued a shared access command, such as a "SCSI persistent reserve" command, to the data storage device in order to obtain shared access to the data storage device, but which does not provide the back-up server with shared access to the data storage device, the filter device driver at that node preferably causes the data storage device to provide the back-up server with shared access to the data storage device, such as by cancelling the shared access command and resending the shared access command to the data storage device together with an identification of at least the node, as the requesting node, and the back-up server as described above.

Although the invention has been described by way of example with respect to a data backup server, it will be appreciated that the invention is not limited to use with a data backup server or data backup applications. Rather, the invention may be used to provide any computing device with access to a shared data storage device in a cluster computing environment for any purpose that requires access to the shared data storage device.

Figure 3:
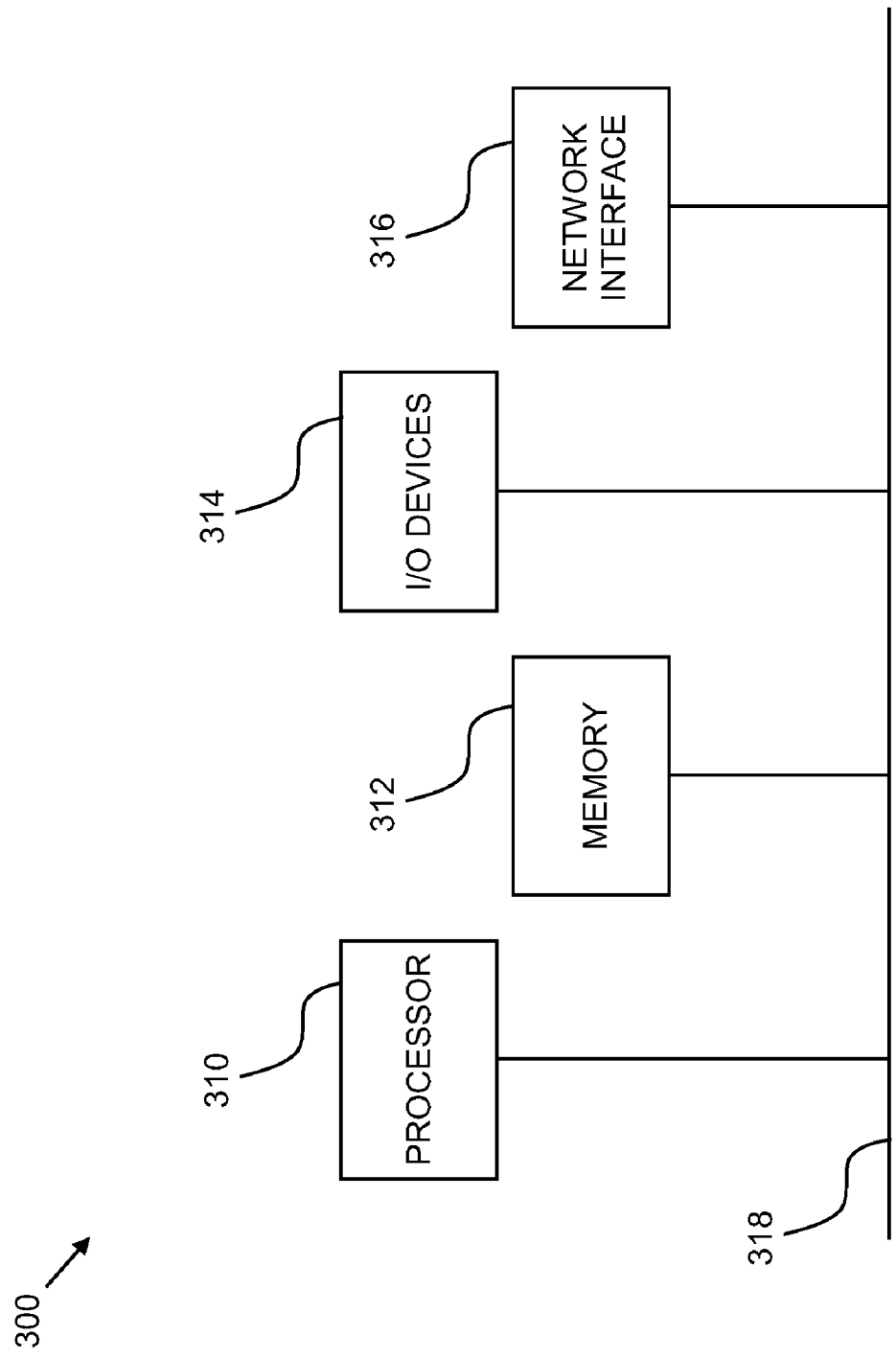
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method for providing shared access to a data storage device in a cluster computing environment, the method comprising:

operating a first compute node, of a plurality of compute nodes in the cluster computing environment, in a passthrough mode;

responsive to receiving, at the first compute node, a message indicating a request to backup data in the data storage device, wherein the message is received via a first channel and identifies a backup server performing the requested backup:

causing the first compute node to enter a hook mode that prevents exclusive access to the data storage device by the first compute node; and while the first compute node is in the hook mode, and responsive to an exclusive access command from the first compute node:

changing, by the first compute node, the exclusive access command to a first shared access command, wherein the first shared access command allows the first compute node to access the data storage device via the first channel, and allows the backup server to access the data storage device via a second channel; and transmitting the first shared access command from the first compute node to the data storage device, wherein the first shared access command allows only the first compute node and the backup server to access to the data storage device.

2. The method of claim 1, wherein the hook mode ensures that each of the compute nodes will not interfere with the requested backup.

3. The method of claim 2, wherein the first compute node does not alter a data access request received from another compute node while in the passthrough mode.

4. The method of claim 1, further comprising:
returning the first compute node to the passthrough mode;
upon determining that the first compute node has successfully issued an exclusive access command when receiving a second message indicating a second request to backup data in the data storage device:
cancelling, by the first compute node, the successful exclusive access command; and
issuing, by the first compute node, second shared access command to the data storage device, thereby allowing only the first compute node and the backup server to access to the data storage device; and
upon determining that the first compute node has issued a third shared access command when receiving the second message:
cancelling, by the first compute node, the third shared access command; and
sending, by the first compute node, a fourth shared access command to the data storage device, thereby allowing only the first compute node and the backup server to access to the data storage device.

5. The method of claim 4, wherein each of the exclusive access commands comprise a SCSI reserve command, wherein each of the shared access commands comprise a SCSI persistent reserve command.

6. The method of claim 1 wherein a device driver executing on the first compute node: (i) causes the first compute node to enter the hook mode, (ii) changes the exclusive access command, and (iii) transmits the first shared access command.

7. A system for providing shared access to data storage resources in a cluster computing environment, the system comprising:
one or more computer processors; and
a memory containing a program, which, when executed by the one or more computer processors, performs an operation to provide shared access to a data storage device in a cluster computing environment, the operation comprising:
operating a first compute node, of a plurality of compute nodes in the cluster computing environment, in a passthrough mode;
responsive to receiving, at the first compute node, a message indicating a request to backup data in the data storage device, wherein the message is received via a first channel and identifies a backup server performing the requested backup:
causing the first compute node to enter a hook mode that prevents exclusive access to the data storage device by the first compute node; and
while the first compute node is in the hook mode, and responsive to an exclusive access command from the first compute node:
changing, by the first compute node, the exclusive access command to a first shared access command, wherein the first shared access command allows the first compute node to access the data storage device via the first channel, and allows the backup server to access the data storage device via a second channel; and
transmitting the first shared access command from the first compute node to the data storage device, wherein the first shared access command allows only the first compute node and the backup server to access to the data storage device.

8. The system of claim 7 wherein the first channel and the second channel are Storage Area Network (SAN) data communications channels, the hook mode ensures that each of the compute nodes will not interfere with the requested backup.

9. The system of claim 8, wherein the first compute node does not alter a data access request received from another compute node while in the passthrough mode.

10. The system of claim 9, the operation further comprising:
returning the first compute node to the passthrough mode;
upon determining that the first compute node has successfully issued an exclusive access command when receiving a second message indicating a second request to backup data in the data storage device:
cancelling, by the first compute node, the successful exclusive access command; and
issuing, by the first compute node, second shared access command to the data storage device, thereby allowing only the first compute node and the backup server to access to the data storage device; and
upon determining that the first compute node has issued a third shared access command when receiving the second message:
cancelling, by the first compute node, the third shared access command; and
sending, by the first compute node, a fourth shared access command to the data storage device, thereby allowing only the first compute node and the backup server to access to the data storage device.

11. The system of claim 10, wherein each of the exclusive access commands comprise an SCSI reserve command.

12. The system of claim 11 wherein each of the shared access commands comprise an SCSI persistent reserve command.

13. The system of claim 12, wherein a device driver executing on the first compute node: (i) causes the first compute node to enter the hook mode, (ii) changes the exclusive access command, and (iii) transmits the first shared access command.

14. A computer program product to provide shared access to data storage resources in a cluster computing environment, the computer program product comprising:
a computer-readable storage medium; and
computer-readable program code embodied in said computer-readable storage medium, wherein said computer-readable program code is configured to:
operate each of a plurality of compute nodes in the cluster computing environment in a passthrough mode; and
responsive to receiving, at each of the plurality of compute nodes, a message indicating a request to backup data in the data storage device, wherein the message is received via a first channel, wherein the message identifies a backup server performing the requested backup:
cause the plurality of compute nodes to enter a hook mode that restricts access to the data storage device by the plurality of compute nodes; and
responsive to an exclusive access command from a first compute node of the plurality of compute nodes:
  cause the first compute node to enter an exclusive access mode;
  change, by the first compute node, the exclusive access command to a first shared access command, wherein the first shared access command allows the first compute node to access the data storage device via the first channel, and allows the backup server to access the data storage device via a second channel; and
  transmit the first shared access command from the first compute node to: (i) the remaining compute nodes, of the plurality of compute nodes, and (ii) the data storage device, wherein the first shared access command causes the data storage device to enter a shared access mode, wherein the first shared access command restricts access to the data storage device by the remaining compute nodes.

15. The computer program product of claim 14, wherein the hook mode ensures that each of the compute nodes will not interfere with the requested backup.

16. The computer program product of claim 15, wherein the first compute node does not alter a data access request received from another compute node while in the passthrough mode.

17. The computer program product of claim 16, wherein the computer readable program code is further configured to:
return the first compute node to the passthrough mode;
upon determining that the first compute node has successfully issued an exclusive access command when receiving a second message indicating a second request to backup data in the data storage device:
  cancel, by the first compute node, the successful exclusive access command; and
  issue, by the first compute node, second shared access command to the data storage device, thereby allowing only the first compute node and the backup server to access to the data storage device; and
upon determining that the first compute node has issued a third shared access command when receiving the second message:
  cancel, by the first compute node, the third shared access command; and
  send, by the first compute node, a fourth shared access command to the data storage device, thereby allowing only the first compute node and the backup server to access to the data storage device.

18. The computer program product of claim 17 wherein each of the exclusive access commands comprise a SCSI reserve command, wherein each of the shared access commands comprise a SCSI persistent reserve command.

19. The computer program product of claim 18, wherein a device driver executing on the first compute node: (i) causes the first compute node to enter the hook mode, (ii) changes the exclusive access command, and (iii) transmits the first shared access command.

\* \* \* \* \*